United States Patent
Meyrick et al.

(10) Patent No.: US 6,933,329 B1
(45) Date of Patent: Aug. 23, 2005

(54) COMPOSITION BASED ON WATER-DISSIPATABLE POLYURETHANE

(75) Inventors: Barry Huston Meyrick, Manchester (GB); Mark Holbrook, Manchester (GB); Stephen George Yeates, Manchester (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/647,479

(22) PCT Filed: Mar. 5, 1999

(86) PCT No.: PCT/GB99/00655
§ 371 (c)(1), (2), (4) Date: Sep. 29, 2000

(87) PCT Pub. No.: WO99/50364
PCT Pub. Date: Oct. 7, 1999

(30) Foreign Application Priority Data
Mar. 31, 1998 (GB) ............................................. 9806788

(51) Int. Cl.$^7$ ........................... C09D 11/10; C08L 74/04
(52) U.S. Cl. ....................................... 523/160; 524/590
(58) Field of Search ................................. 523/160, 161; 106/31.27, 31.28, 31.57, 31.6; 524/323, 589, 590; 347/100

(56) References Cited

U.S. PATENT DOCUMENTS

| 4,531,976 A | * | 7/1985 | Lin .......................... 106/31.35 |
|---|---|---|---|
| 4,532,276 A | * | 7/1985 | Knable et al. ................. 524/18 |
| 5,165,968 A | * | 11/1992 | Johnson et al. ............. 427/288 |
| 5,429,841 A | * | 7/1995 | Batlaw et al. ............... 428/288 |
| 5,466,287 A | * | 11/1995 | Lyon .......................... 524/315 |
| 5,825,391 A | * | 10/1998 | Yang ........................... 347/106 |
| 5,837,042 A | * | 11/1998 | Lent et al. ................ 106/31.14 |
| 6,153,001 A | * | 11/2000 | Suzuki et al. ............. 106/31.65 |
| 6,465,596 B1 | * | 10/2002 | Bruchmann et al. ........... 528/44 |

FOREIGN PATENT DOCUMENTS

| EP | 616 017 | 9/1994 |
|---|---|---|
| EP | 732 381 | 9/1996 |
| EP | 769 509 | 4/1997 |
| GB | 2 105 735 | 3/1983 |

OTHER PUBLICATIONS

Odian, George; Principles of Polymerization 3$^{rd}$ Edition, John Wiley & Sons, New York. 1991 (pp. 108–109).*

Alger, Mark; "Polymer Science Dictionary" 2$^{nd}$ Edition, Chapman and Hall, 1997 (p. 459).*

Odian, George; "Principles of Polymerization" 3$^{rd}$ Edition, John Wiley and Sons, 1991 (pp. 136–137).*

* cited by examiner

*Primary Examiner*—Callie Shosho
(74) *Attorney, Agent, or Firm*—Pillsbury Winthrop LLP

(57) ABSTRACT

A composition comprising water-dissipatable polyurethane, water, colorant, a water-miscible organic solvent and a water-immiscible organic solvent. The compositions are useful as inks for ink jet printers.

10 Claims, No Drawings

COMPOSITION BASED ON WATER-DISSIPATABLE POLYURETHANE

This invention relates to compositions containing certain polyurethanes and to their use in ink jet printing.

Ink jet printing methods involve a non-impact printing technique for printing an image onto a substrate using ink droplets ejected through a fine nozzle onto a substrate without bringing the nozzle into contact with the substrate.

There are many demanding performance requirements for colorants and inks used in ink jet printing. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle. The most popular ink jet printers are the thermal and piezoelectric ink jet printers.

EP 0769 509 describes a high molecular weight chain extended polyurethane formed from a coloured polyurethane prepolymer for use in ink jet printers with piezo heads. However this composition is not ideal for use in ink jet printers with thermal heads because the use of heat results in nozzle blockage and other operability problems.

There is a need for ink compositions which are suitable for both thermal and piezo ink jet printers, have high colour strength and produce images having a high light-fastness and water-fastness when printed on a substrate.

According to a first aspect of the present invention there is provided a composition comprising a water-dissipatable polyurethane having an Mw less than 25,000, water, colorant, a water-miscible organic solvent and a water-immiscible organic solvent.

The Polyurethane

The water-dissipatable polyurethane has preferably been obtained from the reaction of a mixture comprising the components:
i) at least one organic polyisocyanate; and
ii) at least one isocyanate-reactive compound providing dispersing groups.

The water-dissipatable polyurethane has a weight average molecular weight (Mw) less than 25,000 because this can lead to an improved performance of inks containing the polyurethane, especially for use in thermal ink jet printers. The Mw of the polyurethane is preferably less than 20,000, more preferably from 1000 to 15,000, especially from 1000 to 8000, more especially from 1000 to 7000. Mw may be measured by gel permeation chromatography ("gpc").

The gpc method used for determining Mw preferably comprises applying the polyurethane to a chromatography column packed with cross-linked polystyrene/divinyl benzene, eluting the column with tetrahydrofuran at a temperature of 40° C. and assessing the Mw of the polyurethane compared to a number of a polystyrene standards of a known Mw. Suitable cross-linked polystyrene/divinyl benzene chromatography columns are commercially available from Polymer Laboratories.

If the gpc method for determining Mw does not work for any reason then other methods to determine Mw may be used, for example dynamic light scattering.

Component i) may be any organic polyisocyanate known in the art, preferably having two isocyanate groups, and may for example be an aliphatic, cycloaliphatic, aromatic or araliphatic isocyanate. Examples of suitable organic polyisocyanates include ethylene diisocyanate, 1,6-hexamethylene diisocyanate, isophorone diisocyanate, tetramethylxylene diisocyanate, 1,4-phenylene diisocyanate, 2,4-toluene diisocyanate, 2,6-toluene diisocyanate, 4,4'-diphenyl-methane diisocyanate and its hydrogenated derivative, 2,4'-diphenylmethane diisocyanate and its hydrogenated derivative, and 1,5-naphthylene diisocyanate. Mixtures of the polyisocyanates can be used, particularly isomeric mixtures of the toluene diisocyanates or isomeric mixtures of the diphenylmethane diisocyanates (or their hydrogenated derivatives), and also organic polyisocyanates which have been modified by the introduction of urethane, allophanate, urea, biuret, carbodiimide, uretonimine or isocyanurate residues.

Preferred organic polyisocyanates include cycloaliphatic polyisocyanates, especially isophorone diisocyanate, and aliphatic isocyanates, especially 1,6-hexamethylene diisocyanate or hydrogenated 4,4-diphenyl methyl diisocyanate. A small quantity of triisocyanates may be included as part of component i) but this amount preferably does not exceed 5% by weight relative to the total weight of component i). In a preferred embodiment component i) consists of a mixture of diisocyanate and from 0 to 5% (preferably 0%) of triisocyanate by weight relative to the diisocyanate.

Component ii) preferably has at least one, and preferably has two, isocyanate-reactive groups. Preferred isocyanate-reactive groups are selected from —OH, —NH$_2$, —NH— and —SH. Isocyanate-reactive compounds having three isocyanate-reactive groups may be present, preferably in low levels not exceeding 5% by weight relative to the total weight of component ii). These isocyanate-reactive groups are capable of reacting with an isocyanate (—NCO) group in component i) or component iii).

The dispersing groups provide the facility of self-dispersibility and solubility to the polyurethane in ink media, especially in water. The dispersing groups may be ionic, non-ionic or a mixture of ionic and non-ionic dispersing groups. Preferred ionic dispersing groups include cationic quaternary ammonium groups, sulphonic acid groups and carboxylic acid groups.

The ionic dispersing groups may be incorporated into the polyurethane in the form of a low molecular weight polyol or polyamine bearing the appropriate ionic dispersing groups. Preferred isocyanate-reactive compounds providing dispersing groups are diols having one or more carboxylic acid groups, more preferably dihydroxy alkanoic acids, especially 2,2-dimethylol propionic acid.

The carboxylic and sulphonic acid groups may be subsequently fully or partially neutralised with a base containing a cationic charge to give a salt. If the carboxylic or sulphonic acid groups are used in combination with a non-ionic dispersing group, neutralisation may not be required. The conversion of any free acid groups into the corresponding salt may be effected during the preparation of the polyurethane and/or during the preparation of an ink from the polyurethane.

Preferably the base used to neutralise any acid dispersing groups is ammonia, an amine or an inorganic base. Suitable amines are tertiary amines, for example triethylamine or triethanolamine. Suitable inorganic bases include alkaline hydroxides and carbonates, for example lithium hydroxide, sodium hydroxide, or potassium hydroxide. A quaternary ammonium hydroxide, for example N$^+$(CH$_3$)$_4$OH$^-$, can also be used. Generally a base is used which gives the required counter ion desired for the ink which is prepared from the polyurethane. For example, suitable counter ions include Li$^+$, Na$^+$, K$^+$, NH$_4^+$ and substituted ammonium salts.

Non-ionic dispersing groups may be in-chain, pendant or terminal groups. Preferably non-ionic dispersing groups are pendant polyoxyalkylene groups, more preferably polyoxyethylene groups. The non-ionic groups may be introduced into the polyurethane in the form of a compound bearing non-ionic dispersing groups and at least two isocyanate-reactive groups or may be introduced as a capping reagents with only one isocyanate-reactive group on a compound bearing non-ionic dispersing groups.

The nature and level of dispersing groups in the polyurethane influences whether a solution, dispersion, emulsion or suspension is formed on dissipation of the polyurethane.

The dispersing group content of the polyurethane may vary within wide limits but is preferably sufficient to make the polyurethane form stable ink-jet printing inks in water and aqueous media. The polyurethane is preferably soluble in water, although minor amount of the polyurethane may be insoluble in water and exist as dissipated particles when mixed with aqueous media or water.

Preferably the proportion of insoluble, water-dissipatable polyurethane is less than 50%, preferably less than 40% and most preferably less than 30% by weight relative to the total weight of the polyurethane. The size of insoluble polyurethane particulates when dissipated in an ink is preferably less than 100 nm, and more preferably less than 60 nm.

Preferably the polyurethane is not isocyanate terminated.

Terminating compounds may be used to cap off any excess isocyanate or isocyanate reactive end groups in the polyurethane resulting from the reaction of components i) and ii). Compounds having one isocyanate-reactive group include for example monoalcohols, monoamines and monothiols, especially isopropanol. The terminating compounds may also bear dispersing groups as hereinbefore described. If there any excess isocyanate-reactive end groups in the polyurethane resulting from the reaction of component ii), these may optionally be capped off by the addition of compounds having one isocyanate group, for example alkyl monoisocyanates.

The polyurethane may be prepared in a conventional manner by reacting the components having isocyanate groups with the components having isocyanate-reactive groups. Substantially anhydrous conditions are preferred. Temperatures of from 30° C. and 130° C. are preferred and the reaction is continued until the reaction between the isocyanate groups and the isocyanate-reactive groups is substantially complete.

The relative amounts of components i) and ii) are preferably selected such that the mole ratio of isocyanate groups to isocyanate-reactive groups is about 1:1. A two stage process may be utilised where a prepolymer is prepared either in solvent or as a melt, wherein the mole ratio of isocyanate groups to isocyanate-reactive groups from about 1.3:1 to 2:1, preferably from about 1.4:1 to 2:1, followed by reacting any excess isocyanate end groups with a terminating compound.

Alternatively a prepolymer may be prepared wherein the ratio of isocyanate groups to isocyanate-reactive groups are from about 1:1 to 1:2, preferably from about 1:1 to 1:1.3. The excess isocyanate-reactive end groups may optionally be terminated with a terminating compound.

Preferably the polyurethane is not chain-extended. Preferably the reaction is performed entirely under anhydrous conditions, resulting in no substantial extension of polyurethane on mixing the polyurethane with water or water mixed with chain extenders.

If desired a catalyst may be used to assist polyurethane formation. Suitable catalysts include butyl tin dilaurate, stannous octoate and tertiary amines as known in the art.

The polyurethane of the present invention may be purified if desired in the usual way for colorants used in ink jet printing inks. For example a mixture of the polyurethane and water may be purified by ion-exchange filtration, reverse osmosis, dialysis, ultra-filtration or a combination thereof. In this way one may remove cosolvents used for the polymerisation, low molecular weight salts, impurities and free monomers.

The Colorant

The colorant is preferably soluble in the polyurethane. Preferably the Colorant is soluble in organic solvents and insoluble in water, for example preferably it is free from sulpho and carboxy groups. In a preferred embodiment the colorant is a dye, more preferably a dye which is soluble in organic solvents and insoluble in water, especially a disperse dye.

The colorant may be a single component colorant or multi-component colorant, for example it may be a mixture of different dyes. By using a mixture of different dyes as the colorant one may achieve greater flexibility in colour of the ink.

Useful classes of colorants include anthraquinones, phthalocyanines, pyrrolines, triphenodioxazines, methines, benzodifuranones, coumarins, indoanilines, benzenoids, xanthenes, phenazines, solvent soluble sulphur dyes, quinophthalones, pyridones, aminopyrazoles, pyrollidines, styrylics and azoics. Examples of preferred azoics are monoazo, disazo and trisazo disperse dyes each, of which are optionally metallised and solvent soluble dyes; especially preferred azoics contain heterocyclic groups. The Colour Index International lists suitable disperse and solvent soluble dyes, examples of which include Solvent Blue 63, Disperse Blue 24, Solvent Black 3, Solvent Black 35 and Disperse Red 60.

Further examples of disperse dyes are given in the Colour Index, 3rd Edition, Volume 2, pages 2483 to 2741 and further examples of solvent soluble dyes are given in Volume 3, pages 3566 to 3647 and each of these dyes is included herein by reference Preferred colorants for use in the inks include:

CuPc(SO$_2$NHCH$_2$CH$_2$CH$_2$N(CH$_3$)$_2$)$_{2.7}$(SO$_3$H)$_{0.3}$ in which Pc is phthalocyanine; and

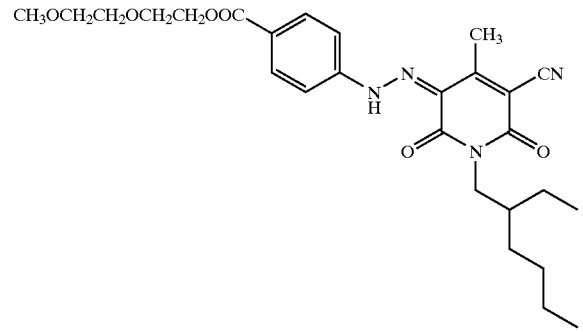

Water-Miscible Organic Solvents

Suitable water-miscible organic solvents include C$_{1-5}$-alkanols, e.g. methanol, ethanol, n-propanol, isopropanol, n-butanol, sec-butanol, tert-butanol and isobutanol: amides, e.g. dimethylformamide and dimethylacetamide; ketones and ketone alcohols, e.g. acetone and diacetone alcohol; C$_{2-4}$-ether, e.g. tetrahydrofuran and dioxane; alkylene glycols or thioglycols containing a C$_2$–C$_6$ alkylene group, e.g. ethylene glycol, propylene glycol, butylene glycol, pentylene glycol and hexylene glycol: poly(alkylene-glycol)s and thioglycol)s, e.g. diethylene glycol, thiodiglycol, polyethylene glycol and polypropylene glycol; polyols, e.g. glycerol and 1,2,6-hexanetriol; and lower alkyl glycol and polyglycol ethers, e.g. 2-methoxyethanol, 2-(2-methoxyethoxy)ethanol, 2-(2-ethoxyethoxy) ethanol, 2-(2-butoxyethoxy)ethanol, 3-butoxypropan-1-ol, 2-[2-(2-methoxyethoxy)-ethoxy] ethanol, 2-[2-(2-ethoxyethoxy)ethoxy]-ethanol; cyclic esters and cyclic amides, e.g. optionally substituted pyrrolidones; sulpholane; and mixtures containing two or more of the aforementioned water-miscible organic solvents.

Preferred water-miscible organic solvents are $C_{1-4}$-alkyl mono ethers of $C_{2-6}$-alkylene glycols and $C_{1-4}$-alkyl mono ethers of poly($C_{2-6}$-alkylene glycols). Cyclic amides are especially preferred.

Water-Immiscible Organic Solvents

Suitable water-immiscible organic solvents include aromatic hydrocarbons, e.g. toluene, xylene, naphthalene, tetrahydronaphthalene and methyl naphthalene; chlorinated aromatic hydrocarbons, e.g. chlorobenzene, fluorobenzene, chloronaphthalene and bromonaphthalene; esters, e.g. butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di (2-ethylhexyl) phthalate; alcohols having six or more carbon atoms, e.g. hexanol, octanol, benzyl alcohol, phenyl ethanol, phenoxy ethanol, phenoxy propanol and phenoxy butanol; ethers having at least 5 carbon atoms, preferably $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; $C_8$–$C_{12}$ substituted pyrrolidones; and mixtures of any two or more thereof. Benzyl alcohol is especially preferred.

Preferred Formulations

The compositions according to the first aspect of the invention may be prepared by mixing the polyurethane, colorant, water, water-miscible organic solvent and water-immiscible organic solvent in any order. Suitable mixing techniques are well known in the art, for example agitation, ultrasonication or stirring of the components. The polyurethane may be present in the composition in any form, preferably in a form suitable for inkjet printing, for example the form of a dispersion, emulsification, suspension, solution or a combination thereof.

Preferably the composition is prepared by mixing a dissipation of the polyurethane in a first liquid medium with a solution of the colorant in a second liquid medium, wherein the first liquid medium comprises water and optionally a water-miscible organic solvent and the second liquid medium comprises a water-immiscible organic solvent and optionally a water-miscible organic solvent.

The weight-ratio of water-miscible organic solvent to water-immiscible organic solvent in the ink is preferably 19:1 to 1:1, more preferably 8:1 to 1:1, especially 5:1 to 1:1.

The amount of colorant and water-dissipatable polyurethane contained in the composition will vary according to the depth of shade required. Typically, however, the composition will comprise:
(a) from 0.5 to 50 parts, more preferably 2 to 20 parts, especially 4 to 12 parts of a water-dissipatable polyurethane (preferably having a weight average molecular weight less than 25,000);
(b) from 0.1 to 20 parts, more preferably 0.5 to 10 parts, especially 0.5 to 3 parts of colorant;
(c) from 40 to 90 parts, more preferably from 50 to 80 parts of water;
(d) from 2 to 30 parts, more preferably 5 to 15 parts, especially from 8 to 12 parts of a water-immiscible organic solvent; and
(e) from 2 to 60 parts, more preferably from 5 to 25 parts, especially from 10 to 20 parts of a water-miscible organic solvent;
wherein all parts are by weight and the total number of parts of (a)+(b)+(c)+(d)+(e) add up to 100.

The number of parts of the water-dissipatable polyurethane is calculated on a 100% solids basis. For example 50 g of a 20% solids polyurethane is taken as 10 g of polyurethane.

The composition optionally contains a biocide, for example Proxel GXL (Proxel is a trade mark of Zeneca Limited) or Kathon (Kathon is a trade mark of Rohm and Haas), a fungicide, a rheological agent, e.g. a wax (e.g. beeswax), a clay (e.g. bentonite), an IR absorber, for example Projet 900NP (Projet is a trade mark of Zeneca Limited), or a fluorescent brightener, for example C.I. Fluorescent Brightener 179 and/or UV absorber, for example hydroxy phenylbenzotriazole. Furthermore the compositions optionally contain a surface active agent, wetting agent and/or an emulsifier, for example those described in McCutcheon's Emulsifiers and Detergents 1996 International Edition or in Surfactants Europa $3^{rd}$ Edition 1996 each of which is incorporated herein by reference.

The composition preferably has a pH from 3 to 11, more preferably from 4 to 10. The pH selected will depend to some extent on the desired cation for any acid groups present in the polyurethane and the materials used to construct the ink jet printer head. The desired a pH may be obtained by the addition of an acid, base or a pH buffer. Where a base is used this is preferably the same base as was used to neutralise the anionic dispersing group during the preparation of the polyurethane.

The viscosity of the composition is preferably less than 20 cp, more preferably less than 15 cp, especially less than 10 cp, at 20° C.

Preferably the composition has been filtered through a filter having a mean pore size below 10 µm, more preferably below 5 µm, especially below 2 µm, more especially below 1 µm. Such filtration removes particles which could otherwise block the fine nozzles in print heads, thereby improving reliability of the compositions and printers.

The compositions of the present invention have the advantage that they may be used not only in piezoelectric ink jet printers but also in thermal and continuous ink jet printers. Many other inks based on polymers work poorly or even not at all in thermal ink jet printers.

Compositions of the invention form discrete droplets on the substrate with little tendency for diffusing. Consequently sharp images with excellent print quality and little if any bleed between colours printed side by side can be obtained. Furthermore the compositions show good storage stability, wet and light fastness and fastness to both acidic and alkaline highlighter pens.

Preferred compositions according to the invention are used as inks, especially ink jet printing inks. Alternatively the composition may be used as a concentrate which is diluted or otherwise converted into an ink.

A further aspect of the invention provides a process for printing an image on a substrate comprising applying thereto a composition according to the first aspect of the present invention by means of an ink jet printer.

The ink jet printer preferably applies the composition to the substrate in the form of droplets which are ejected through a small nozzle onto the substrate. Preferred ink jet printers are piezoelectric ink jet printers and thermal ink jet printers. In thermal ink jet printers, programmed pulses of heat are applied to the composition in a reservoir by means of a resistor adjacent to the nozzle, thereby causing the ink to be ejected in the form of small droplets directed towards the substrate during relative movement between the substrate and the nozzle. In piezoelectric ink jet printers the oscillation of a small crystal causes ejection of the ink from the nozzle.

The substrate is preferably a paper, plastic, or textile material, more preferably a paper, an overhead projector slide or a textile material, especially paper.

Preferred papers are plain, coated or treated papers which may have an acid, alkaline or neutral character.

According to a further feature of the invention there is provided an ink jet printer cartridge containing a composition as hereinbefore defined.

The invention will now be described by example only. All parts and percentages are by weight unless specified otherwise. In the examples, compounds referred to by reference to CI numbers are the dyestuffs identified by these numbers in the Colour Index International. $3^{rd}$ Edition. $3^{rd}$ Revision.

EXAMPLE 1

Stage 1 - Preparation of a Water Dissipatable Polyurethane ("Resin 1") (completely chain terminated with MPEG750)

| Component Number | Component Name | Weight (g) |
|---|---|---|
| 1 | Isophorone diisocyanate | 492.21 |
| 2 | polypropylene glycol of molecular weight 1000 | 357.8 |
| 3 | dimethylol propionic acid | 150 |
| 4 | methoxy polyethylene glycol of molecular weight 750 | 1383.7 |
| 5 | N-methylpyrrolidone | 250 |
| 6 | dibutyl tin dilaurate | 0.8 |
| 7 | dibutyl tin dilaurate | 0.2 |
| 8 | dimethyl ethanolamine | 99.8 |
| 9 | distilled water | 6800 |

Components 1,2,3 and 5 were charged to a stirred reaction vessel under a nitrogen atmosphere, heated to 50° C. and component 6 was added. The reaction exothermed by about 3° C. and was then maintained at 90-95° C. for 3 hours. A sample of the resultant mixture (3.519 g) was removed to determine the % NCO content (found to be 4.71%). Component 4 followed by component 7 were added to the mixture and the temperature was maintained at 90° C. until the isocyanate band as determined by an IR spectrum had almost disappeared (2 hours).

Component 8 was added to the stirred mixture at 50° C. and allowed to mix for 10 minutes. The resultant mixture at 50° C. was dispersed into component 9 at 30° C. During the addition, the temperature of the water rose to about 42° C. The mixture was stirred for a further one hour, cooled to room temperature, and filtered through a 50 μm cloth filter.

The resultant water-dissipatable polyurethane in water was found to have a solids content of 24.4% and a pH of 7. The weight average molecular weight (MW) was determined by applying the polyurethane to a gpc column packed with cross-linked polystyrene/divinyl benzene, eluting with tetrahydrofuran at 40° C. and assessing the MW compared to a number of polystyrene standards of known MW. The Mw was found to be =4791 (Mn was 1729).

Stage 2—Preparation of Ink 1

A sample of a solvent soluble phthalocyanine dye (1 g) was dissolved in a mixture of benzyl alcohol (10 g) and 2-pyrrolidone (20 g) using a sonicator. A mixture of the water-dissipatable polyurethane resulting from Stage 1 (40.9 g, 24.4% w/w dissipation in water) and water (28.1 g) were added and the mixture was shaken to give Ink 1 having the formulation:

| Component | Amount (g) |
|---|---|
| Dye | 1 |
| Resin 1 | 40.9 (24.4% solids) |
| Benzyl alcohol (Immiscible) | 10 |
| 2-pyrrollidone (Miscible) | 20 |
| Water | 28.1 |
| | 100 |

EXAMPLE 2

Stage 1—Preparation of a Water-Dissipatable Polyurethane ("Resin 2") (completely chain terminated with Jeffamine M1000 available from Huntsman Corporation, USA)

TABLE 1

| Component Number | Component Name | Weight (g) |
|---|---|---|
| 1 | Isophorone diisocyanate | 492.21 |
| 2 | polypropylene glycol of molecular weight 1000 | 357.8 |
| 3 | dimethylol propionic acid | 150 |
| 4 | Jeffamine M1000 | 1543.35 |
| 5 | N-methylpyrrolidone | 250 |
| 6 | dibutyl tin dilaurate | 1.0 |
| 7 | dimethyl ethanol amine | 99.72 |
| 8 | distilled water | 7282.5 |

Components 1,2,3 and 5 were charged to a stirred reaction vessel under a nitrogen atmosphere, heated to 50° C. and component 6 was added. The reaction exothermed by about 3° C. and was then maintained at 90-95° C. for 3 hours. A sample of the resultant mixture (3.519 g) was removed to determine the % NCO content (found to be 4.71%). Component 4 was added to the mixture and the temperature maintained at 90° C. for a further hour or until the isocyanate band as determined by an the IR spectrum had disappeared.

Component 7 was added to the stirred mixture at 50° C. and allowed to mix for 10 minutes. The resultant mixture at 50° C. was dispersed into component 8 at 30° C. During the addition, the temperature of the water rose to about 42° C. The mixture was stirred for a further one hour, cooled to room temperature and filtered through a 50 μm cloth filter.

The resultant mixture of water and water-dissipatable polyurethane was found to have a solids content of 24.2% and a pH of 8.3. The Mw was determined by GPC to be 6597.

Stage 2—Preparation of Ink 2

A sample of the phthalocyanine dye used in Example 1 (1 g) was dissolved in a mixture of benzyl alcohol (10 g) and 2-pyrrolidone (20 g) using a sonicator. A mixture of the water-dissipatable polyurethane described in Example 2, Stage 1 (41.3 g 24.19% w/w solution in water) and water (27.7 g) were added and the mixture was shaken to give Ink 2 having the formulation:

| Component | Amount (g) |
|---|---|
| Dye | 1 |
| Resin 2 | 41.3 (24.19% solids) |
| Benzyl alcohol (Immiscible) | 10 |
| 2-pyrrollidone (Miscible) | 20 |
| Water | 27.7 |
| | 100 |

EXAMPLES 3 TO 6

The method of Example 2, stage 1 was repeated except that in place of the components indicated Example 1, Table 1, there was used the component indicated in Table 2 below. Components 2a and 2b were used as a mixture in place of the component 2 used in Example 1. All amounts are in grammes. The lower part of Table 2 gives the % solids content, pH, Mn, Mw and surface tension of the resultant Resin.

TABLE 2

| Component Number | Component Name | Example 3 | Example 4 | Example 5 | Example 6 |
|---|---|---|---|---|---|
| 1 | IPDI | 488.3 | 483.1 | 477.9 | 472.7 |
| 2a | PPG | 361.7 | 366.9 | 372.1 | 377.3 |
| 2b | CHDM | 30.0 | 70 | 110 | 150 |
| 3 | DMPA | 120.0 | 80 | 40 | 0 |
| 4 | JM 1000 | 1442.8 | 1493.3 | 1536.8 | 1445.5 |
| 5 | NMP | 250 | 250 | 250 | 25 |
| 6 | DBTL | 1 | 1 | 1 | 1 |
| 7 | DEA | 79.8 | 53.2 | 26.6 | 0 |
| 8 | $H_2O$ | 7282.5 | 7282.5 | 7282.5 | 7282.5 |
| % Solids | | 24.4 | 24.4 | 24.1 | 23.9 |
| pH | | 8.7 | 8.8 | 9.1 | 9.6 |
| Mn | | 4740 | 4620 | 4340 | 4990 |
| Mw | | 7500 | 7190 | 6680 | 7530 |
| Surface tension (mN/m) | | 37.2 | 36.9 | 37.7 | 38.6 |

PPG = polypropylene glycol of molecular weight 1000
DMPA = dimethylol propionic acid
IPDI = isophorone diisocyanate
CHDM = 1,4-cyclohexane dimethanol
JM 1000 = Jeffamine M1000
NMP = N-methyl pyrrolidone
DBTL = dibutyl tin laurate
DEA = dimethyl ethanolamine
$H_2O$ = distilled water The water-dissipatable polyurethanes resulting from Examples 3 to 6 were incorporated into inks by the method of Example 1, stage 2, to give inks 3 to 6 respectively.

COMPARATIVE EXAMPLE 1

High Molecular Weight Polyurethane

Preparation of Ink C1

An ink was prepared using a high molecular weight commercially available polyurethane dispersion called Neorez R961 (Obtained from Zeneca Resins).

A sample of the phthalocyanine dye used in Example 1 (1 g) was dissolved in a mixture of benzyl alcohol (10 g) and 2-pyrrolidone (20 g) using a sonicator. A mixture of Neorez R961 (26.5 g, 34% w/w dispersion in water) and water (32.5 g) was added and the mixture was shaken to give Ink C1 having the formulation:

| Component | Amount (g) |
|---|---|
| Dye | 1 |
| Neorez R961 | 26.5 (34% solids) |
| Benzyl alcohol (Immiscible) | 10 |
| 2-pyrrollidone (Miscible) | 20 |
| Water | 32.5 |
| | 100 |

COMPARATIVE EXAMPLE 2

No Polyurethane

Preparation of Ink C2

A sample of the phthalocyanine dye used in Example 1 (1 g) was dissolved in a mixture of benzyl alcohol (10 g) and 2-pyrrolidone (20 g) using a sonicator. Water (69 g) was added and the mixture was shaken to give a Ink C2 having the formulation:

| Component | Amount (g) |
|---|---|
| Dye | 1 |
| Benzyl alcohol (Immiscible) | 10 |
| 2-pyrrollidone (Miscible) | 20 |
| Water | 69 |
| | 100 |

Ink C2 was found to be unstable to storage because a precipitate formed after standing overnight. Therefore a freshly prepared sample of ink was used for the tests described in Table 1 below.

EXAMPLE 7

Ink Jet Printing Using the Inks

Inks 1 to 6 and Inks C1 and C2 were printed onto paper using a Hewlett Packard thermal inkjet printer. The paper used for Inks 1, 2, C1 and C2 was Conqueror High White Wove plain paper 100 g/m$^2$ from Arjo Wiggins Ltd and the paper used for Inks 3 to 6 was Xerox acid paper. The properties of the resultant prints are shown in Table 1 below.

The resultant prints using inks according to the invention had very good colour strength and brightness (chroma) as indicated in Table 1 and showed very high water fastness. 0.5 ml of water run down a test print only 5 minutes after printing produced virtually no stain on the white paper.

TABLE 1

| Ink | Ink stability | print quality | ROD | wet rub after 5 min |
|---|---|---|---|---|
| Ink 1 | good | good | 0.69 | 9 |
| Ink 2 | good | good | 0.65 | 9 |
| Ink 3 | stable | good | 0.91 | 10 |

TABLE 1-continued

| Ink | Ink stability | print quality | ROD | wet rub after 5 min |
|---|---|---|---|---|
| Ink 4 | stable | good | 0.91 | 10 |
| Ink 5 | stable | good | 0.91 | 10 |
| Ink 6 | stable | good | 0.91 | 10 |
| Ink C1 (Comparative) | poor | did not fire | x | x |
| Ink C2 (Comparative) | poor | good | 0.907 | 10 |

ROD is the reflected optical density of the resultant print.
Wet rub after 5 minutes was scored 1 to 10 wherein 1 represents poor rub fastness and 10 represents excellent rub fastness.
x means could not be measured.

EXAMPLE 8

Further inks may be prepared having the formulations described in Tables 2 and 3 below wherein the following abbreviations are used. These inks may be applied to plain paper using an ink jet printer.

FRU: fructose
PU*: Identifies which of the polyurethanes as prepared in Examples 1 to 6 may be used. The number of parts by weight of PU is shown in brackets.
BZ: Benzyl alcohol
DEG: Diethylene glycol
DMB: Diethyleneglycol monobutyl ether
ACE: Acetone
IPA: Isopropyl alcohol
MEOH: Methanol
2P: 2-Pyrollidone
MIBK: Methylisobutyl ketone
SUR: Surfinol 465 (a surfactant)
PHO: $K_2PO_4$
TEN: triethanolamine
NMP: N-methylpyrollidone
TDG: Thiodiglycol
CAP: Caprolactam
BUT: Butylcellosolve
GLY: Glycerol
Colorant 1: CuPc $(SO_2NHCH_2CH_2CH_2N(CH_2)_3)_{2.7}(SO_3H)_{0.3}$ wherein Pc is phthalocyanine.
Colorant 2: The pyridone dye drawn on page 5 above.

TABLE 2

| Colorant | Colorant Content | Water | PU* (parts) | BZ | DEG | ACE | NaOH | $(NH_4)_2SO_4$ | IPA | MEOH | 2P | MIBK | BUT |
|---|---|---|---|---|---|---|---|---|---|---|---|---|---|
| 1 | 2.0 | 58 | 1(10) | 4 | 6 | | | | | | 10 | 10 | |
| 2 | 3.0 | 61.8 | 1(10) | 5 | 5 | | 0.2 | | | | 15 | | |
| 1 | 2.1 | 60.9 | 2(6) | 8 | | | | | | | 20 | 1 | 2 |
| 3 | 1.1 | 61.9 | 2(12) | 9 | | 0.5 | | 0.5 | | | 9 | 5 | 1 |
| 1 + 2 | (3 + 2) | 54 | 3(5) | 15 | 3 | 3 | | | 6 | | 5 | 4 | |
| 1 | 5 | 50 | 2(15) | 20 | | | | | 10 | | | | |
| 2 | 2.4 | 51.6 | 1(5) | 4 | | 5 | | | 6 | 20 | 5 | | 1 |
| 2 | 4.1 | 68.6 | 3(10) | 5 | 2 | 10 | | 0.3 | | | | | |
| 1 | 3.2 | 57.8 | 2(4) | 5 | 4 | 6 | | | 5 | 4 | 6 | 5 | |
| 1 | 5 | 70 | 3(10) | 6 | 2 | 2 | | | 1 | | 4 | | |
| 2 | 1.8 | 63.2 | 2(10) | 5 | | | | | | | 15 | | 5 |
| 1 | 3.3 | 63.7 | 2(12) | 5 | | 5 | | | | 2 | | 6 | 3 |
| 2 | 2.0 | 62.7 | 3(5) | 10 | | 7 | 0.3 | | 3 | | 10 | | |
| 2 | 5.4 | 49.6 | 4(4) | 20 | 2 | 1 | | | | | 15 | 3 | |
| 1 | 1.0 | 63 | 5(7) | 5 | 4 | | | | | | 15 | 5 | |

TABLE 3

| Colorant | Colorant Content | Water | PU* (parts) | BZ | NMP | SUR | TEN | TDG | FRU | PHO | DMB | $CH_3NH_2$ | CAP |
|---|---|---|---|---|---|---|---|---|---|---|---|---|---|
| 2 | 1.5 | 63 | 1(10) | 5 | | 0.15 | 0.5 | 20 | | | | | |
| 1 | 2.5 | 60 | 2(15) | 6 | 15 | | | | | 0.12 | | | 4 |
| 1 | 3.1 | 64 | 3(10) | 8 | | 0.3 | | 15 | | | 0.2 | | |
| 2 | 0.9 | 63 | 1(5) | 10 | 20 | | | | 0.5 | 0.2 | | | |
| 2 | 8.0 | 40 | 1(15) | 15 | 15 | | | 5 | | | | | 2 |
| 2 | 4.0 | 67 | 2(10) | 10 | 4 | | | | 1 | | 4 | 0.2 | |
| 1 | 2.2 | 67 | 2(10) | 10 | 3 | | | | 2 | | 6 | | |
| 2 | 9.0 | 54 | 3(15) | 9 | 7 | | 0.5 | | | 0.95 | 5 | | |
| 2 | 5.0 | 57 | 2(10) | 11 | | | | | 10 | | 6 | | 1 |
| 1 | 5.4 | 54 | 3(12) | 5 | 17 | | | | | | 7 | | |
| 1 | 2.1 | 65 | 1(15) | 5 | 5 | 0.1 | 0.2 | 2 | 0.5 | 0.1 | 5 | | |
| 2 | 2 | 56 | 2(10) | 10 | 5 | | | 12 | | | 5 | | |
| 1 | 8 | 52 | 3(20) | 5 | 8 | | | | | | 5 | | 2 |
| 1 | 10 | 63 | 2(13) | 2 | | | | | | | 12 | | |
| 1 | 10 | 71 | 1(5) | 10 | | | 1 | 1 | | | | 1 | 1 |

What is claimed is:

1. An ink jet printing ink composition comprising water, water-miscible organic solvent, water-immiscible organic solvent, a colorant which is soluble in the water-immiscible solvent, and a water-dissipatable polyurethane having a weight average molecular weight less than 25,000, which is obtained from the reaction of:

(a) at least one diisocyanate; and (b) at least one compound having one or two isocyanate reactive groups;

wherein the mole ratio of isocyanate groups to isocyanate-reactive groups is about 1:1.

2. A composition according to claim 1 wherein the colorant is soluble in the polyurethane.

3. A composition according to claim 1 wherein the water-immiscible organic solvent is benzyl alcohol.

4. A composition according to claim 1 comprising:

(a) from 0.5 to 50 parts of a water-dissipatable polyurethane having a weight average molecular weight less than 25,000;

(b) from 0.1 to 20 parts of colorant;

(c) from 40 to 90 parts of water;

(d) from 2 to 30 parts of a water-immiscible organic solvent; and (e) from 2 to 60 parts of a water-miscible organic solvent; wherein all parts are by weight relative to the total of (a)+(b)+(c)+(d)+(e).

5. A composition according to claim 1 wherein the polyurethane has a weight average molecular weight from 1,000 to 15,000.

6. A composition according to claim 1 having a viscosity less than 20 cp at 20° C.

7. A composition according to claim 1 which has been filtered through a filter having a mean pore size below 10 $\mu$m.

8. A process for printing an image on a substrate comprising applying thereto a composition according to claim 1 by means of an ink jet printer.

9. An ink jet printer cartridge containing a composition according to claim 1.

10. An ink jet printing ink composition comprising water, water-miscible solvent, water-immiscible organic solvent, colorant which is soluble in the water-immiscible organic solvent and water-dissipatable polyurethane having a weight average molecular weight less than 25,000.

* * * * *